US011202524B1

(12) United States Patent
     Moore (10) Patent No.: US 11,202,524 B1
(45) Date of Patent: Dec. 21, 2021

(54) STOWABLE AND DEPLOYABLE RUG

(71) Applicant: Antoinette Vera Moore, Albuquerque, NM (US)

(72) Inventor: Antoinette Vera Moore, Albuquerque, NM (US)

(*) Notice: Subject to any disclaimer, the term of this patent is extended or adjusted under 35 U.S.C. 154(b) by 0 days.

(21) Appl. No.: 16/738,979

(22) Filed: Jan. 9, 2020

Related U.S. Application Data

(60) Provisional application No. 62/790,935, filed on Jan. 10, 2019.

(51) Int. Cl.
     *B32B 7/08* (2019.01)
     *A47G 27/02* (2006.01)

(52) U.S. Cl.
     CPC ........... *A47G 27/0206* (2013.01); *B32B 7/08* (2013.01); *B32B 2307/726* (2013.01); *B32B 2307/744* (2013.01); *B32B 2471/04* (2013.01)

(58) Field of Classification Search
     CPC .... A47K 3/002; A47K 3/001; A47G 27/0206; A47G 27/0225; A47G 7/08; A47G 2307/726; A47G 2307/744; A47G 2471/04
     See application file for complete search history.

(56) References Cited

U.S. PATENT DOCUMENTS

| | | | | |
|---|---|---|---|---|
| 4,407,029 | A | * 10/1983 | Schmidt | A61G 7/1057 4/564.1 |
| 5,131,709 | A | * 7/1992 | Spica | B60R 9/00 105/423 |
| 5,596,962 | A | 1/1997 | Tsunoda et al. | |
| 5,971,192 | A | 10/1999 | Immerman et al. | |
| 2006/0168720 | A1 | 8/2006 | Dellarocca | |
| 2011/0084038 | A1 | 4/2011 | Zack et al. | |
| 2013/0061386 | A1 | 3/2013 | Vagliardo | |
| 2017/0231466 | A1* | 8/2017 | Lee | A47L 19/04 211/41.6 |
| 2017/0280941 | A1* | 10/2017 | Kuo | B32B 3/266 |

OTHER PUBLICATIONS

"Best Non-Slip Bath & Shower Mat—Make Your Bathroom Safe," Edward Fernandez, Nov. 27, 2017, available at: http://perfectshowerhead.com/best-non-slip-bath-shower-mat/, downloaded on Jan. 9, 2020, 6 pages.

* cited by examiner

*Primary Examiner* — Alexander S Thomas
(74) *Attorney, Agent, or Firm* — Faegre Drinker Biddle & Reath LLP (57) ABSTRACT

Embodiments of the present disclosure include an absorbent, storable, low-profile, non-slip, quick drying rug that is stored in an upright position against a wall or tub when the rug is not being used for drying, so as to maintain the rug's cleanliness and enhance its quick-drying capabilities. Also disclosed is a method for using an absorbent, storable, low-profile, non-slip, quick drying rug.

17 Claims, 10 Drawing Sheets

FIG. 9B

STOWABLE AND DEPLOYABLE RUG

CROSS REFERENCE TO RELATED APPLICATIONS

This application claims priority under 35 U.S.C. § 119(e) to U.S. Provisional Application Ser. No. 62/790,935, filed on Jan. 10, 2019, the disclosure of which is herein expressly incorporated by reference.

BACKGROUND OF THE DISCLOSURE

Rugs are useful for absorbing moisture and reducing slip and fall accidents. Yet conventional rugs, such as hall or bathroom rugs, generally occupy a substantial portion of floor space in a room, which can be particularly problematic in locations with a limited floor area. In addition, rugs located near doors can impede the operation of those doors. Further, traditional bathroom rugs, most advantageously used by clean, bare feet, can easily become dirty with normal bathroom shoe and foot traffic.

SUMMARY

Embodiments of the present disclosure include an apparatus configured to provide several of the advantageous characteristics of rugs, such as the ability to absorb moisture, and to further provide, e.g., improved operational and storage characteristics. For example, some embodiments provide a rug with storable, low-profile characteristics combined with moisture absorbance. These embodiments may also feature non-slip and quick-drying characteristics. As a result, the rugs in these embodiments are easier to use, safer, and cleaner than traditional rugs.

In a first embodiment, a stowable and deployable apparatus for moisture absorbance comprises a first layer formed of a permeable, non-slip material, the first layer having a stowed configuration and a deployed configuration; a second layer formed of an absorbent material, the second layer being permanently attached to the first layer; and one or more closing mechanisms attached to a perimeter portion of the first layer, the one or more closing mechanisms being configured to selectively retain and deploy the first layer in its stowed and deployed configurations.

In variations of the first embodiment, the first layer includes a first portion and a second portion, and wherein the first portion and the second portion are substantially parallel when the first layer is in its stowed configuration. The first portion and the second portion of the first layer may be substantially perpendicular when the first layer is in its deployed configuration.

In variations of the first embodiment, the second layer is permanently attached to a first portion of the first layer, and wherein an outer surface of the second layer contacts a second portion of the first layer when the first layer is in its stowed configuration.

In variations of the first embodiment, the apparatus further includes one or more surface fasteners arranged on an outer surface of the first layer, wherein the one or more surface fasteners are configured to removably attach the first layer to a substantially vertical surface.

In variations of the first embodiment, the apparatus further includes means for removably attaching the first layer to a vertical surface.

In variations of the first embodiment, the first layer is unitarily formed of a single material. That single material may be polyvinyl chloride or similar materials.

In variations of the first embodiment, the first layer is formed by injection molding.

In variations of the first embodiment, the first layer includes a plurality of regularly spaced moisture channels.

In variations of the first embodiment, the first layer includes a plurality of moisture channels, with the first layer having a portion that includes between 25 and 75 moisture channels per cm2.

In variations of the first embodiment, the first layer includes a plurality of moisture channels, with each moisture channel of the plurality of moisture channels having a width of about 0.5 mm to about 2 mm.

In variations of the first embodiment, the first layer includes a plurality of moisture channels and a plurality of elements, with each element of the plurality of elements located between two moisture channels of plurality of moisture channels, and wherein at least a portion of each element has a convex profile.

In variations of the first embodiment, the first layer includes a plurality of raised projections defining moisture channels.

In variations of the first embodiment, the first layer includes a first portion configured to couple to a vertical surface and a second portion configured to contact a floor when the first layer is in its deployed configuration.

In a second embodiment, a permeable, non-slip layer for a rug comprises an upper portion configured to couple to a vertical surface; a lower portion formed of a water impermeable material and having a plurality of moisture channels configured to transmit moisture from an upper surface of the lower portion to a lower surface of the lower portion; and a flexible section located between the upper portion and the lower portion so that the lower portion can moved from a deployed configuration adjacent the floor to a stowed configuration adjacent the upper portion.

In variations of the second embodiment, the upper portion includes moisture channels sized to receive and secure fastening mechanisms configured to couple the upper portion to the vertical surface.

In variations of the second embodiment, at least some of the moisture channels are regularly spaced.

In variations of the second embodiment, the lower portion includes a region having between 25 and 75 moisture channels per cm2.

In variations of the second embodiment, the moisture channels have a dimension of about 0.5 mm to about 2 mm.

In variations of the second embodiment, a portion of the lower portion located between two moisture channels has a convex profile.

In variations of the second embodiment, the moisture channels are at least partially defined by a plurality of raised projections.

The preceding is a simplified summary of the disclosure to provide an understanding of some aspects of certain embodiments of the disclosure. This summary is neither an extensive nor exhaustive overview of the disclosure and its various aspects, embodiments, and configurations. It is intended neither to identify key or critical elements of the disclosure nor to delineate the scope of the disclosure but to present selected concepts of the disclosure in a simplified form as an introduction to the more detailed description presented below. As will be appreciated, other aspects, embodiments, and configurations of the disclosure are possible utilizing, alone or in combination, one or more of the features set forth above or described in detail below.

Furthermore, as used herein the term "a" or "an" refers to one or more. As such, the terms "a" (or "an"), "one or more"

and "at least one" may be used interchangeably herein. It is also to be noted that the terms "comprising", "including", and "having" may be used interchangeably. It should be understood that every maximum numerical limitation given throughout this disclosure is deemed to include each and every lower numerical limitation as an alternative, as if such lower numerical limitations were expressly written herein. Every minimum numerical limitation given throughout this disclosure is deemed to include each and every higher numerical limitation as an alternative, as if such higher numerical limitations were expressly written herein. Every numerical range given throughout this disclosure is deemed to include each and every narrower numerical range that falls within such broader numerical range, as if such narrower numerical ranges were all expressly written herein.

BRIEF DESCRIPTION OF THE DRAWINGS

The accompanying drawings are incorporated into and form a part of the specification to illustrate several examples of the present disclosure. These drawings, together with the description, explain the principles of the disclosure. The drawings simply illustrate preferred and alternative examples of how the disclosure may be made and used and are not to be construed as limiting the disclosure to only the illustrated and described examples. Further features and advantages will become apparent from the following, more detailed, description of the various aspects, embodiments, and configurations of the disclosure, as illustrated by the drawings referenced below. Corresponding reference characters indicate corresponding parts throughout the several views. The exemplifications set out herein illustrate exemplary embodiments and such exemplifications are not to be construed as limiting the scope in any manner.

DETAILED DESCRIPTION

Embodiments of the present disclosure provide an absorbent, storable (stowable), low-profile, non-slip, quick drying rug system. For example, certain embodiments discussed herein provide a rug system that can be stowed in a vertical or upright position against a wall or tub when the rug system is not being used for drying, so as to maintain the rug's cleanliness and reduce spatial impact. The rug system includes quick-drying layers with moisture channels for wicking away absorbed moisture, so as to enhance its quick-drying capabilities. Generally speaking, the term rug, as used herein, refers to a floor covering and includes mats, carpets, and other floor coverings that fulfill the purposes detailed herein.

Figure 1:
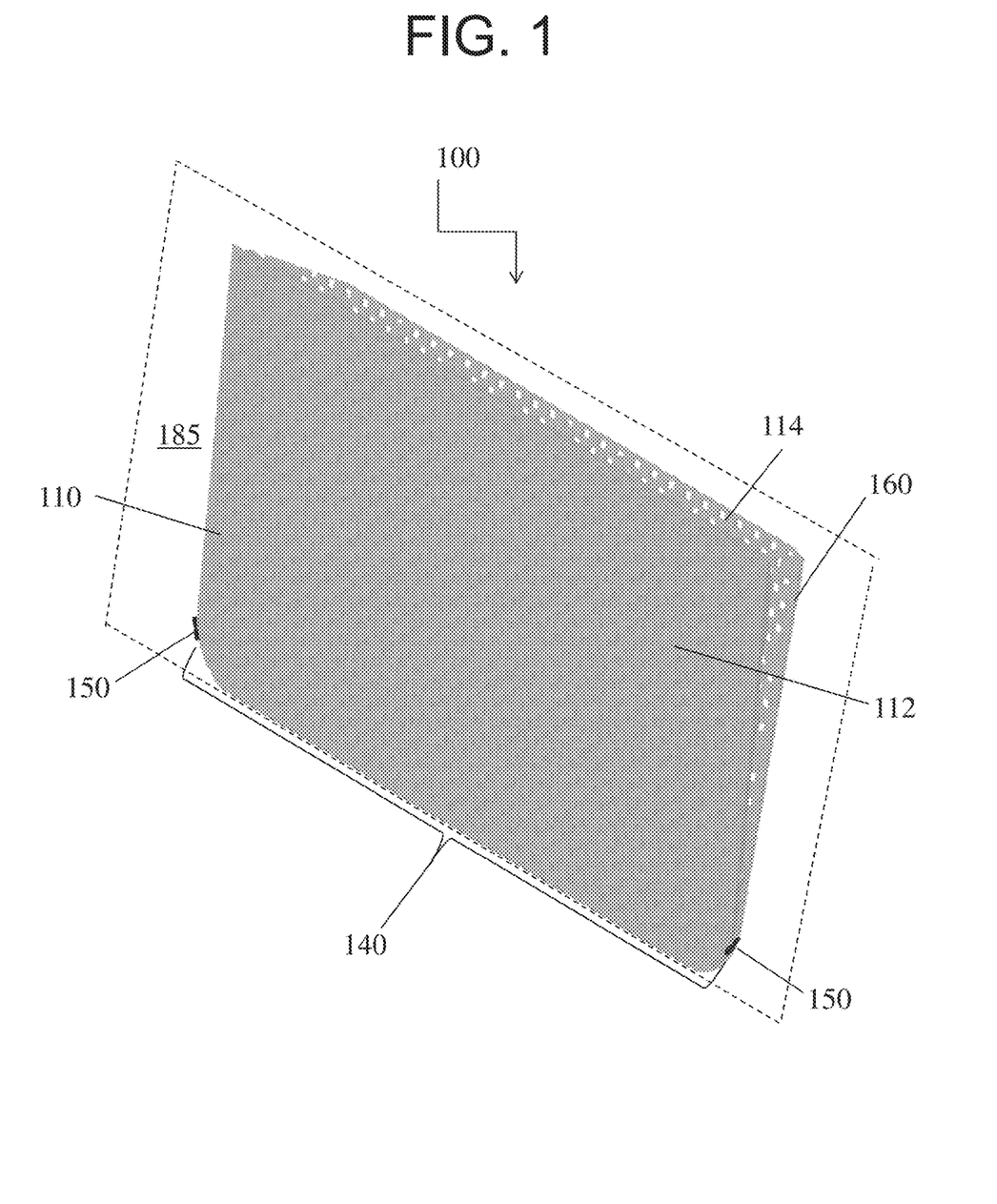
FIG. 1 is a front perspective view of a rug system in a partially stowed, low-profile configuration, according to embodiments of the present disclosure.
Figure 2:
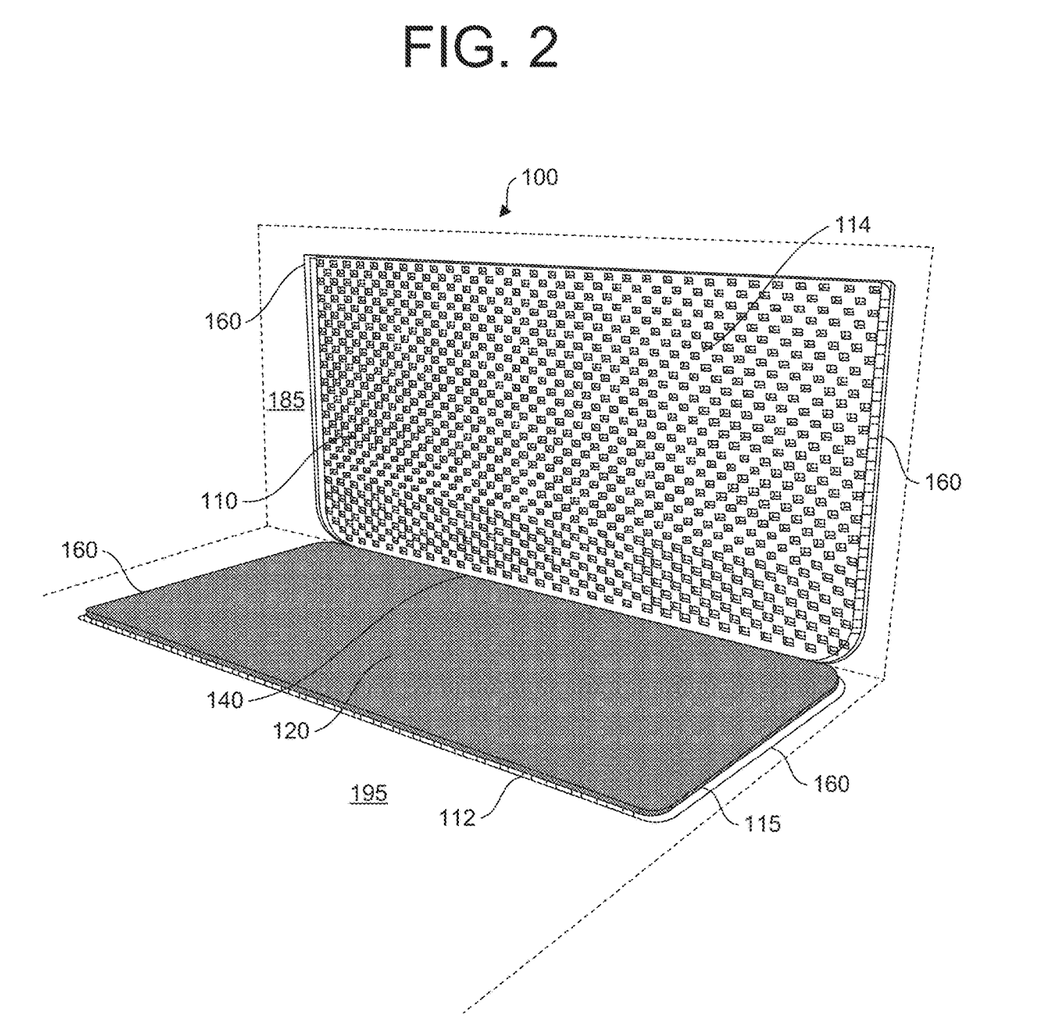
FIG. 2 is a perspective view of the rug system of FIG. 1 in a deployed configuration, with an extended hinge angle and a section of a permeable non-slip layer in contact with the floor, according to embodiments of the present disclosure.

As shown in FIGS. 1 and 2, a rug system 100 is formed from a permeable non-slip layer 110 and an absorbent layer 120. The permeable non-slip layer 110 includes a first portion 112 and a second portion 114. The rug system 100 also includes a hinge portion 40 that spans the at least a portion of the length of the rug system 100 and connects the first portion 112 of the permeable non-slip layer 110 with the second portion 114 of the permeable non-slip layer 110. The rug system 100 also includes at least one closing mechanism 150 on one or more of its perimeter edges 160. The rug system 100 may be attached to a vertical surface 185, such as a wall or tub. The rug system 100 further interacts with a horizontal surface 195, such as a floor.

FIG. 1 illustrates the rug system 100 in a partially stowed configuration. In some embodiments, the rug system 100 reaches a fully stowed configuration using a closing mechanism, 150, such as a zipper, which may be located on a perimeter edge 160 of the rug system 100. FIG. 1 illustrates two zippers located on opposite sides of the rug system on perimeter edges. When the zippers or closing mechanisms are engaged, the first portion 112 and the second portion 114 of the permeable non-slip layer 110 are brought into a substantially parallel orientation. For example, in some embodiments the second portion 114 may be secured to a vertical surface 185, such as the vertical wall of a tub. When the rug system 100 is placed into the stowed or fully stowed configuration, the first portion 112 is brought and secured into a parallel configuration with the second portion 114. In this configuration, the permeable non-slip layer 110 appears to be folded in-half along the edge containing the hinge portion 140, with the hinge edge located closest in proximity to the floor 195 or other surface below.

As shown in FIG. 2, the rug system 100 may be placed in an open or deployed configuration, where the first portion 112 of the permeable non-slip layer 110 is located at an angle relative to the second portion 114 of the permeable non-slip layer 110. For example, the first portion 112 may be located at a 90-degree angle relative to the second portion 114. As a result, the second portion 114 extends vertically and longitudinally (in parallel to the wall of the tub) while the first portion 112 extends horizontally and longitudinally (in parallel to the floor and perpendicular to the second portion 114). In such embodiments, the first portion 112 of the permeable non-slip layer 110 is in contact with the floor 195 or other surface. In some embodiments, an absorbent layer 120 is attached to the first portion 112 of the permeable non-slip layer 110, and as such, in this configuration, the absorbent layer 120 is parallel to the first portion 112 of the permeable non-slip layer 110. In such a configuration, the absorbent layer 120 is at a similar angle to the second portion 114 of the permeable non-slip layer 110 as the first portion 112 of the permeable non-slip layer 110.

In some embodiments, when the rug system 100 is in a deployed or open (extended) configuration, the hinge portion 140 is configured to extend to an angle of approximately 90 degrees. In some embodiments, when in deployed or open (extended) configuration, the hinge portion 140 is configured to extend to an angle of no more than 110 degrees. In some embodiments, the hinge portion 140 is designed to extend to an angle of around 90 degrees, e.g., between 80 degrees and 100 degrees, but can be forced to greater angles due to the nature of the material forming the hinge portion. However, forcing the angle beyond its intended limits can create buckling in the hinge portion 140 (and/or the connecting portions of the permeable non-slip layer 110). As a result, in some embodiments, the hinge portion 140 is designed to extend to an angle of around 90 degrees or less than 110 degrees without substantial buckling.

In other embodiments, the hinge portion 140 is designed to provide a transition section between the first portion 112 and the second portion 114 of the permeable non-slip layer 110. In these embodiments, the hinge portion 140 forms a first angle with respect to the first portion 112 at its connection to the first portion 112 and a second angle with respect to the second portion 114 at its connection to the second portion 114. The first and second angles add to about 90 degrees. For example, the first angle may be about 45 degrees and the second angle may be about 45 degrees. Changing the magnitudes of the first and second angles changes the position of the first portion 112 relative to the second portion 114. For example, if the second angle is 0 degrees (i.e., the hinge portion 140 continues in parallel to the second portion 114), the first portion 112 will be located horizontally closer to the second portion 114 than if the second angle is greater than 0 degrees (e.g., 45 degrees). In some embodiments, having the second angle be approximately 0 degrees enables the rug system 100 to have a smaller footprint in its deployed configurations.

In some embodiments, the hinge portion 140 spans a longitudinal length that is less than the longitudinal length of the first portion 112 and/or the second portion 114. For example, as shown in FIGS. 1-2, the first portion 112 and the second portion 114 are formed with straight perimeter edges and curved perimeter corners. In some embodiments, the hinge portion 140 may connect to the first portion 112 and/or the second portion 114 only along corresponding straight perimeter edges, with no connection to the curved perimeter corners. The hinge portion 140 may continually connect to the first portion 112 and/or the second portion 114 along the entirety of those corresponding straight perimeter edges. In other embodiments, the hinge portion 140 may connect to only sections of the corresponding straight perimeter edges. Those sections may be adjacent sections or may be multiple sections separated by one or more gaps. In yet other embodiments, the hinge portion 140 may connect to curved perimeter corners of the first portion 112 and/or the second portion 114. In those embodiments, the sections of the hinge portion 140 connecting to the curved perimeter corners of the first portion 112 and/or the second portion 114 may be reinforced portions to strengthen the rug system 100.

Figure 3:
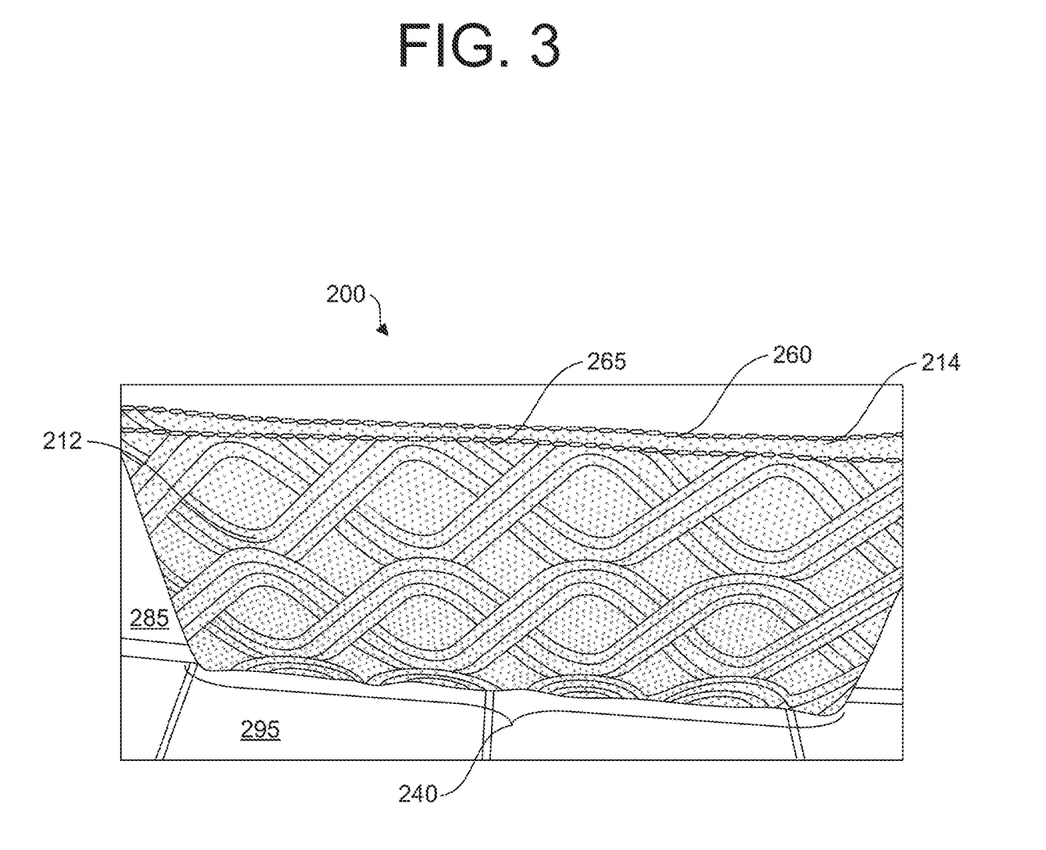
FIG. 3 is a front view of a rug system in a stowed configuration, according to embodiments of the present disclosure.
Figure 4A:
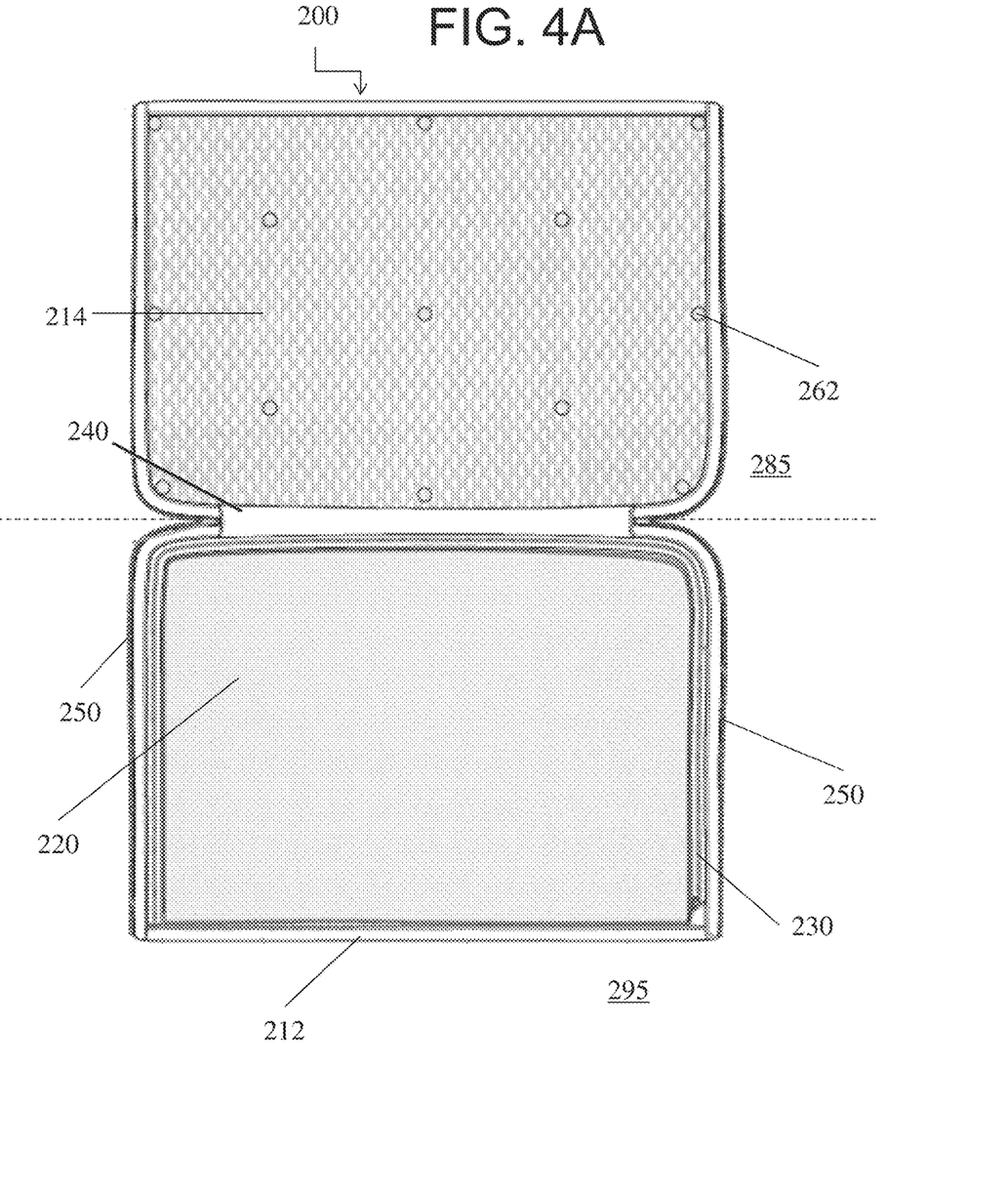
FIG. 4A is a front view of the rug system of FIG. 3 a deployed configuration, with an extended hinge angle and a section of a permeable non-slip layer in contact with the floor, with an absorbent layer attached to the non-slip layer, according to embodiments of the present disclosure.
Figure 4B:
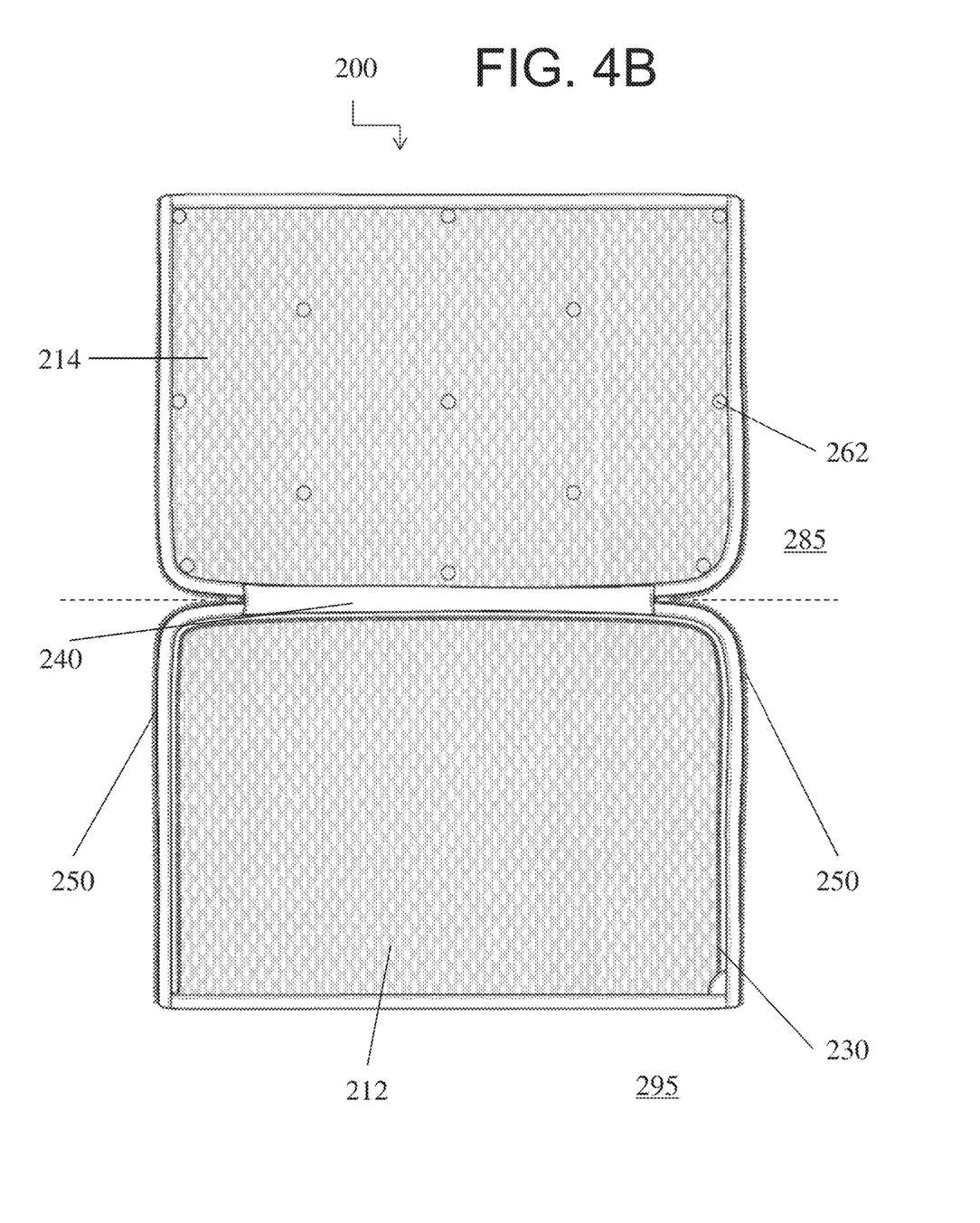
FIG. 4B is a front view of the rug system of FIG. 3 a deployed configuration, with an extended hinge angle and a section of a permeable non-slip layer in contact with the floor, without an absorbent layer attached to the non-slip layer, according to embodiments of the present disclosure.

FIG. 3 and FIGS. 4A-4B illustrate another embodiment of a rug system 200. Rug system 200 includes features similar to those discussed above with respect to rug system 100. Rug system 200 includes a permeable non-slip layer 210 and an absorbent layer 220. The permeable non-slip layer 210 includes a first portion 212 and a second portion 214. The rug system 200 also includes a hinge portion 240 that spans the at least a portion of the length of the rug system 200 and connects the first portion 212 of the permeable non-slip layer 210 with the second portion 214 of the permeable non-slip layer 210. The rug system 200 may be attached to a vertical surface 285, such as a wall or tub. The rug system 200 further interacts with a horizontal surface 295, such as a floor.

In some embodiments, the rug system 200 includes at least one closing mechanism 250 on one or more of its perimeter edges. For example, the rug system 200 may include a zipper or one or more magnetic fasteners 265 located at a perimeter edge 260 of the permeable non-slip layer. The magnetic fasteners could include two magnets or a magnet in combination with a magnetic material. In some embodiments, the closing mechanisms may be located with the absorbent layer 220, either alone or in combination with closing mechanisms incorporated into the permeable non-slip layer. Other exemplary closing mechanisms include hook and loop fasteners or other mechanical fasteners, vacuum fasteners such as suction cups, and/or chemical fasteners. In some embodiments, the second portion 214 of the permeable non-slip layer is attached to one or more surface fastener 262.

In some embodiments of the rug system 200, the absorbent layer 220 is permanently attached to the permeable non-slip layer 210. In some embodiments of the rug system 200, the absorbent layer 220 is removable from the first portion 212 of the permeable non-slip layer. In some embodiments, the absorbent layer 220 and the first portion 212 of the permeable non-slip layer include a zipper or other attachment mechanism 230 that allows the absorbent layer to be detachable from the first portion of the permeable non-slip layer. When the zippers or attachment mechanisms 230 are engaged, as depicted in FIG. 4A, the first portion 212 of the permeable non-slip layer and the absorbent layer 220 are brought into a substantially parallel orientation. When the zippers or attachment mechanisms 230 are disengaged, as depicted in FIG. 4B, the first portion 212 of the permeable non-slip layer is not in a substantially parallel orientation and/or not connected with absorbent layer 220.

Figure 5A:
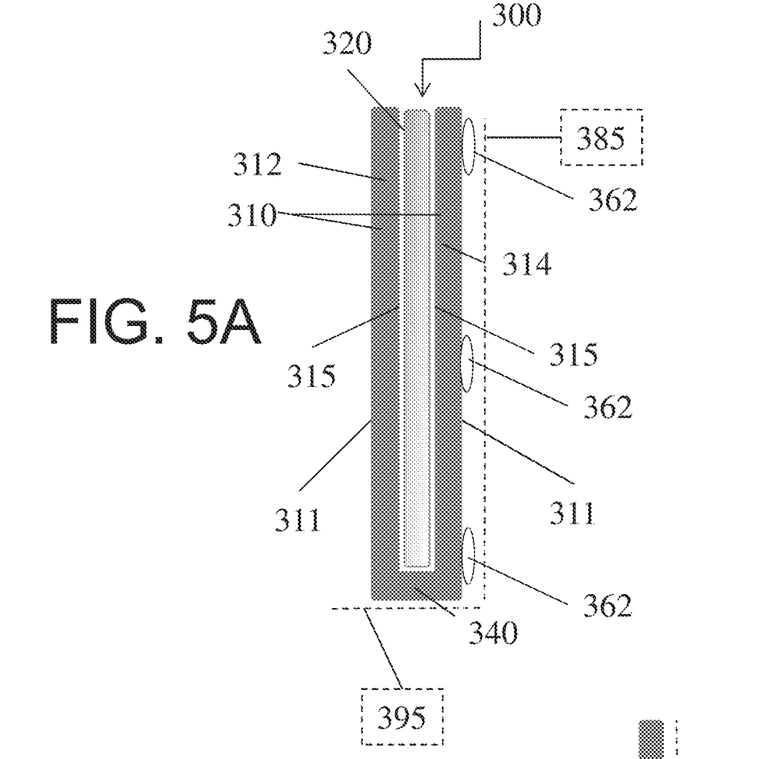
FIG. 5A is a side view of a rug system in a stored (stowed) configuration, according to embodiments of the present disclosure.
Figure 5B:
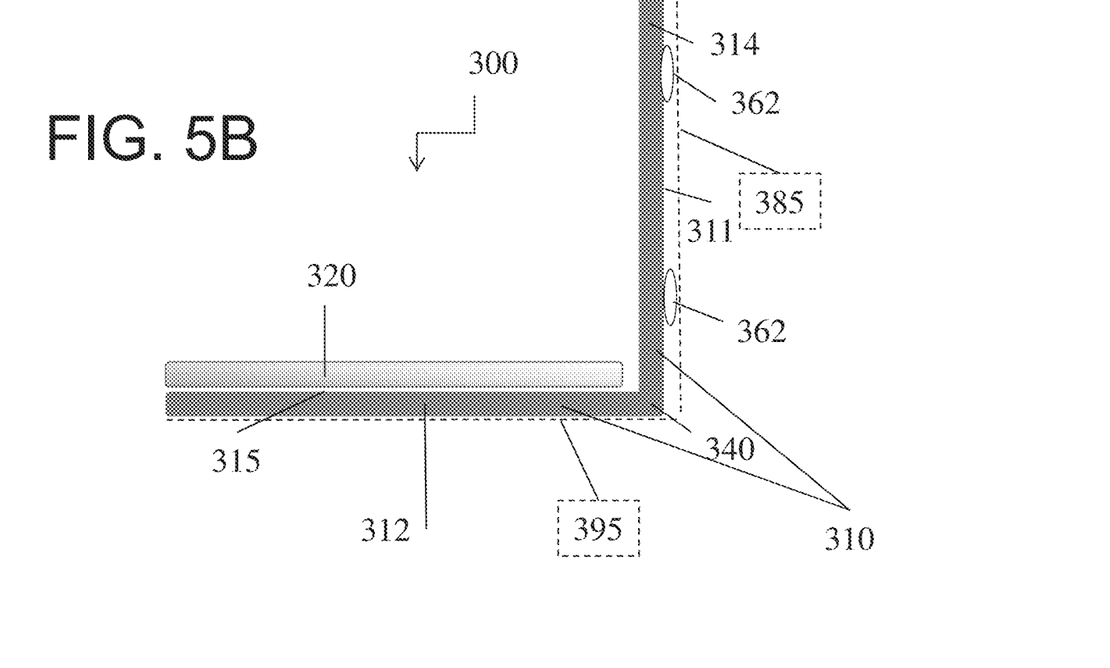
FIG. 5B is a side view of the rug system of FIG. 5A in a deployed configuration, with an extended hinge angle and a section of a permeable non-slip layer in contact with the floor, according to embodiments of the present disclosure.
Figure 5C:
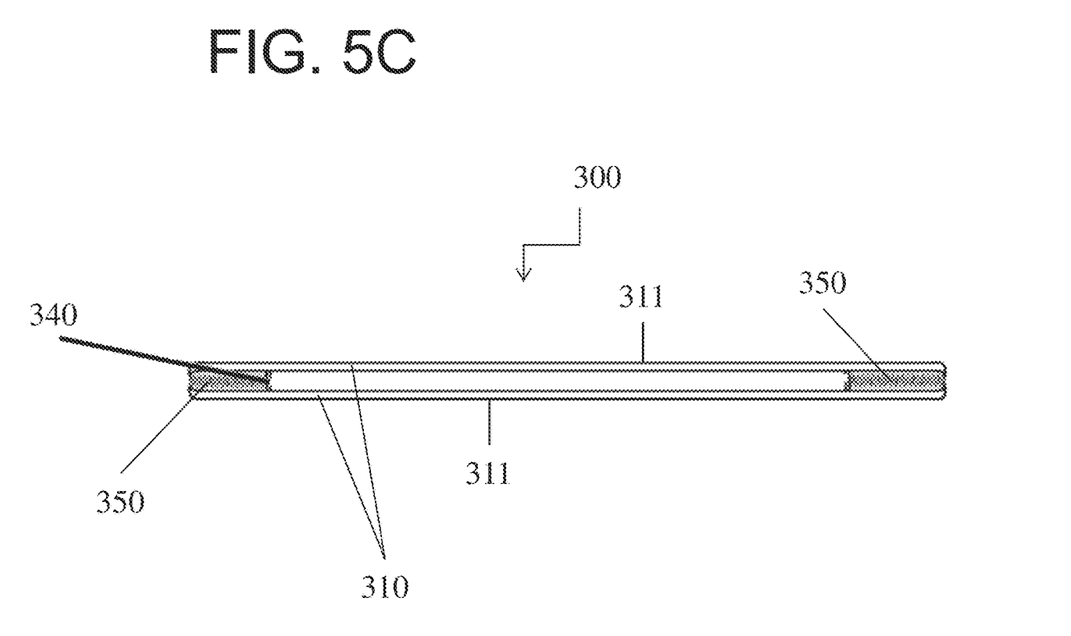
FIG. 5C is an exterior view of the hinge portion of the rug system of FIG. 5A.

As shown in FIGS. 5A and 5B, which depict side views of an embodiment of a rug system 300, the permeable non-slip layer 310 has an inner surface 315 and an outer surface 311. FIG. 5C depicts an exterior-view of a hinge portion 340 of an embodiment of a rug system 300. In some embodiments, the first portion 312 of the permeable non-slip layer 310 is attached on its inner surface 315 to an absorbent layer 320, and the second portion 314 of the permeable non-slip layer 310, is attached on its outer surface 311 to one or more surface fasteners 362. The rug system 300 also includes a hinge portion 340 that spans the at least a portion of the length of the rug system 300 and connects the first portion 312 of the permeable non-slip layer 310 with the second portion 314 of the permeable non-slip layer 310. In some embodiments, the rug system 300 is attached to a vertical surface 385, such as a wall or tub, via one or more surface fasteners 362. When in a stowed configuration, as shown in FIG. 5A, the absorbent layer 320 contacts the inner surface 315 of both the first portion 312 of the permeable non-slip layer 310 and the second portion 314 of the permeable non-slip layer 310. In some embodiments, as shown in FIG. 5C, the rug system 300 contains a closing mechanism, 350, such as a zipper.

As discussed above, in some embodiments, the second portion 314 of the permeable non-slip layer 310 is attached to one or more surface fastener 362. Those surface fasteners 362 could include mechanical means or chemical means, including but not limited to suction cups, Velcro, hooks, loops, magnets, double-sided tape, and other mechanisms capable of attaching to the permeable, non-slip layer 10, and a vertical surface as discussed throughout the specification.

In some embodiments, the surface fasteners 362 are permanently attached to the permeable non-slip layer 310. In other embodiments, the surface fasteners 362 are removable from the permeable non-slip layer, such that they can optionally be positioned be adjusted per the user's preference or the needs of the surface to which the rug is to be attached. In some embodiments, the surface fasteners are attached to the permeable non-slip layer with chemical means, including but not limited to glue and tack. In some embodiments, one or more surface fasteners 362 are positioned within one or more of the moisture channels (e.g., 470 in FIG. 7), such that the opening of the moisture channel is the appropriate diameter to receive and secure a portion of the surface fastener 362. In such embodiments, some moisture channels 70 may have openings with a larger or smaller diameter such that these openings can maintain the surface fasteners 60. For example, in some embodiments a surface fastener includes a first portion designed to engage a moisture channel. The opening of the moisture channel may be slightly smaller than the size of the first portion of the surface fastener, such that the material forming the moisture channel stretches as the first portion of the surface fastener is inserted into the moisture channel. Resiling forces exerted by the material forming the moisture channel helps secure the surface fastener. In some embodiments, a distal end of the first portion of the surface fastener includes an enlarged end to provide a "snap" fit into the moisture channel.

In some embodiments, the surface fasteners 362 are distributed uniformly across the outer surface of the permeable non-slip layer 314. In some embodiments, the surface fasteners 362 are located between about 4 cm and about 8 cm apart. In some embodiments, the surface fasteners 362 are located about 7.5 cm apart. In some embodiments, the surface fasteners 362 are distributed non-uniformly across the permeable non-slip layer 314. In some embodiments, there are surface fasteners 362 on the outer portion of the first permeable non-slip layer 312. In some embodiments, there are no surface fasteners 362 on the outer portion of the first permeable non-slip layer.

In some embodiments, the absorbent layer 320 is unitarily formed with the first portion 312 of the permeable non-slip layer 310. In some embodiments, the absorbent layer 320 is integrally formed with the first portion 312 of the permeable non-slip layer 310. In some embodiments, the absorbent layer 320 is attached to the first portion 312 of the permeable non-slip layer 310 by one or more of sewing, gluing, heating and bonding, laminating, and the like (or combinations thereof).

In some embodiments, the permeable non-slip layer 310 is formed of a non-absorbent material. In some embodiments, the permeable non-slip layer 310 is formed of a material that is permeable to air and/or water. In some embodiments, the permeable non-slip layer 310 is arranged along, or contains, a regular pattern. In some embodiments, the permeable non-slip layer 310 is arranged along, or contains, an irregular pattern. In some embodiments, the pattern includes a weave that enhances the grip of the first portion 312 of the permeable non-slip layer 310 on the floor 395 or other surface. In some embodiments, the pattern (e.g., weave) enhances the grip of the second portion 314 of the permeable non-slip layer 310 on a vertical surface 385.

Figure 6:
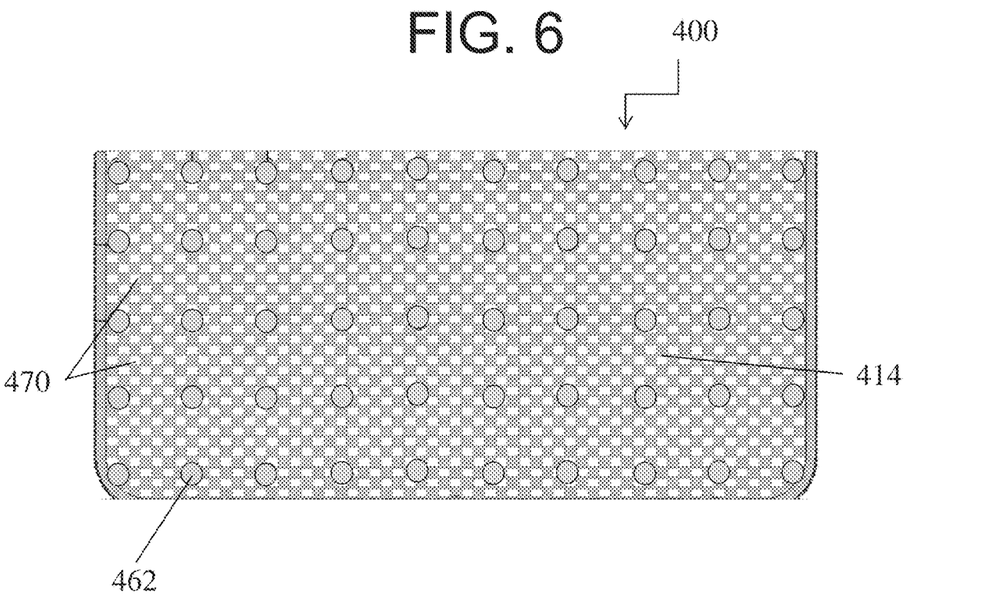
FIG. 6 is a view of an outer surface of a permeable non-slip layer, with surface fasteners for attachment to a vertical surface, according to embodiments of the present disclosure.
Figure 7:
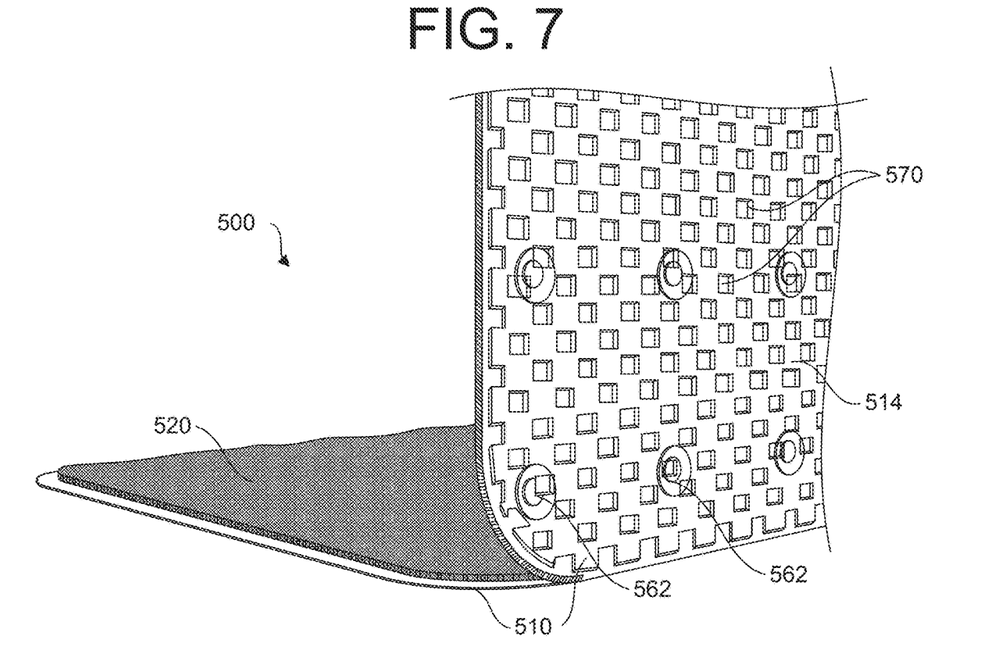
FIG. 7 is a perspective view of an outer surface of a permeable, non-slip layer of a rug, with surface fasteners for attachment to a vertical surface, wherein the rug is in a deployed configuration, with an extended hinge angle and a section of a permeable non-slip layer in contact with the floor, according to embodiments of the present disclosure.

As shown in FIG. 6 and in FIG. 7, in some embodiments of a rug system 400 or 500, a permeable non-slip layer 410 or 510 has a woven or simulated woven pattern creating moisture channels 470 or 570. In some embodiments, the moisture channels 470 or 570 are capable of air movement or circulation, particularly for air to move between an outer surface of the layer and an inner surface of the layer. In some embodiments, the moisture channels 470 or 570 are capable of conveying liquid (e.g., water) an outer surface of the layer and an inner surface of the layer. For example, in a stowed configuration, when the absorbent layer (520 in FIG. 7) is in contact with both portions of the permeable non-slip layer 510, moisture is able to be moved or wicked away from the absorbent layer 520 from both sides of the permeable, non-slip layer 510 via the moisture channels 570. In some embodiments, fastening members 462 or 562 couple to the permeable non-slip layer 410 or 510 using the moisture channels 470 or 570.

While FIGS. 6 and 7 show embodiments of moisture channels 470 or 570 within the permeable non-slip layer 410 or 510 generally having a square or rectangular shape, other shapes for the moisture channels 470 or 570 can include linear, circular, oval, hexagonal, octagonal, or lacking a uniform shape and seemingly randomly shaped. The openings of the moisture channels 470 or 570 can have a size and shape consistent with the size and shape of the woven pattern of the permeable non-slip layer 410 or 510. The moisture channels 470 or 570 can be composed of a plurality of convex portions formed along a first direction on a first surface, and a plurality of concave portions oriented in a second direction perpendicular to the first direction, such that the moisture channels 470 or 570 are formed between the concave portions. In some embodiments, the moisture channels 470 or 570 have a diameter of from about 0.5 mm to about 2 mm. In some embodiments, there are about 25-75 moisture channels 60 per square cm of the permeable, non-slip layer 470 or 570.

Figure 8:
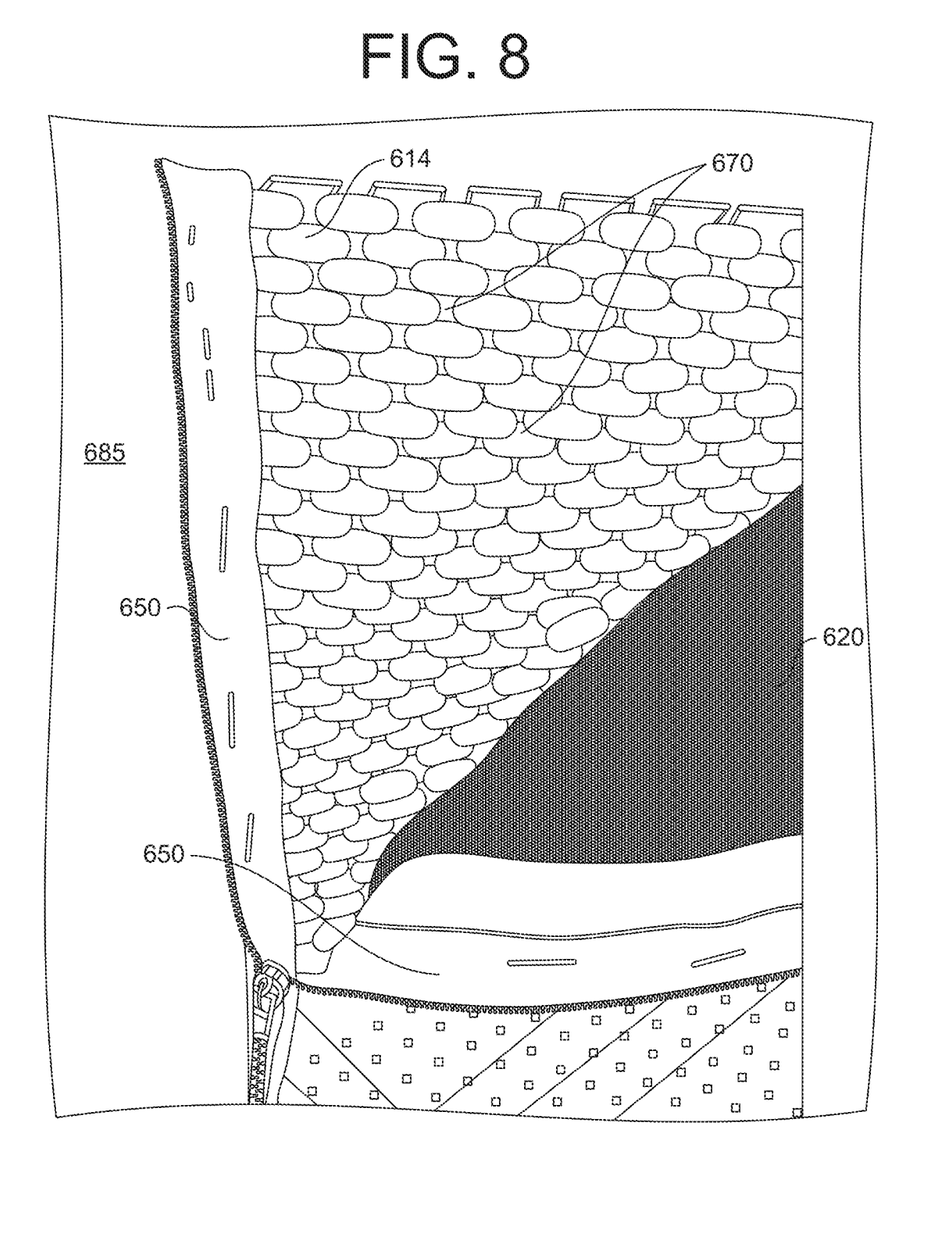
FIG. 8 is an enlarged view of a closing mechanism of a rug system, according to embodiments of the present disclosure.

FIG. 8 shows the closing mechanism 650 in a partially-stowed and partially-deployed configuration, such that a portion of the permeable non-slip layer 610 and a portion of an absorbent layer 620 are visible. Also visible in FIG. 8 are moisture channels 670 as well as a portion 614 of the permeable non-slip layer 610 attached to a vertical service 685.

In some embodiments, the permeable non-slip layer (e.g., 110 in FIG. 1) is composed of plastic or polymer materials such as, but not limited to, polyvinyl chloride ("PVC"), PVC over polyester scrim, vinyl coated polyester, silicone, neoprene polychloroprene ("neoprene rubber"), rubber, vinyl, styrene butadiene rubber ("SBR"), foam rubber, thermoplastic elastomers and/or the like. In some embodiments, the permeable non-slip layer is composed of a bio-based material which comprises a renewable material, a biodegradable material, or a combination thereof. The bio-based material may comprise, for example, a bio-based plastic made from a renewable resource. The bio-based plastic may be wholly bio-based or may be partially bio-based. The bio-based plastic may compose enough of the rug such that the rug is eligible for third-party certification and voluntary labeling under the United States Department of Agriculture (USDA) BioPreferred® Program. The bio-based plastic may be made from a renewable agricultural resource including but not limited to corn, potatoes, soy, rice, sugarcane, wheat, and vegetable oil, a renewable marine resource including but not limited to algae and chitin, or a renewable forestry resource including but not limited to wood. The bio-based plastic may comprise thermoplastic starch (TPS), polylactic acid (PLA), polyhydroxyalkanoates (PHA), bio-PVC, bio-based polyurethane (PU), and cellulose acetate.

In some embodiments, the permeable non-slip layer (e.g., 110 in FIG. 1) is composed of a mold and/or mildew resistant material. In some embodiments, the permeable non-slip layer is treated with an antimicrobial additive or solution during formation of the permeable non-slip layer or after formation of the permeable non-slip layer. The antimicrobial additive or solution may be organic or inorganic.

In some embodiments, the permeable non-slip layer (e.g., 110 in FIG. 1) is composed of a machine-washable material. In some embodiments, the permeable non-slip layer is composed of a machine-dryable material. In some embodiments, the permeable non-slip layer may be exposed to temperatures up to approximately 125 degrees Fahrenheit without damage to the permeable non-slip layer. In some embodiments, the permeable non-slip layer may be exposed to temperatures up to approximately 135 degrees Fahrenheit without damage to the permeable non-slip layer.

The permeable non-slip layer (e.g., 110 in FIG. 1) is thick enough to provide comfort for standing on the rug but not too thick so as to bunch or create a bulky profile when in either the stowed or the deployed configuration. In some embodiments, the permeable non-slip layer is between about 0.25 cm and about 2.5 cm thick. In some embodiments, the permeable non-slip layer is at least about 1 cm thick. In a preferred embodiment, the permeable non-slip layer is between about 0.25 cm and about 1.5 cm thick. In a more preferred embodiment, the permeable non-slip layer is between about 0.5 cm and 1 cm thick.

In some embodiments, the first portion of the permeable non-slip layer (e.g., 112 in FIG. 1), the hinge portion (e.g., 140 in FIG. 1), and the second portion of the permeable non-slip layer (e.g., 114 in FIG. 1) are a unitary structure of non-slip material and is manufactured as a single piece. In some embodiments, the hinge portion includes a zipper or other attachment mechanism that allows the first portion of the permeable non-slip layer to be detachable from the second portion of the permeable non-slip layer. In such embodiments, the first portion of the permeable non-slip layer can optionally be detached from the second portion of the permeable non-slip layer to be washed or to be replaced with a different first portion of the permeable non-slip layer.

The physical dimensions of the permeable non-slip layer (e.g., 110 in FIG. 1) may vary to accommodate various profiles of the vertical surface and/or floor. In some embodiments, the permeable non-slip layer is rectangular in shape. In some embodiments, the permeable non-slip layer is round or oblong in shape. In some embodiments, the second portion of the permeable non-slip layer (e.g., 114 in FIG. 1) has a larger surface area than the first portion of the permeable non-slip layer (e.g., 112 in FIG. 1) and a portion of the second portion of the permeable non-slip layer folds over and contacts the outer surface of the first portion of the permeable non-slip layer. In some embodiments, the absorbent layer (e.g., 120 in FIG. 1) has the same surface area as the first portion of the permeable non-slip layer (e.g., 112 in FIG. 1) to which it is attached. In some embodiments, the absorbent layer has a slightly smaller surface area than the first portion of the permeable non-slip layer to which it is attached.

In some embodiments, the absorbent layer (e.g., 120 in FIG. 1) is made of a water-permeable material. In some embodiments, the absorbent layer is made of a quick-dry material. In some embodiments, the absorbent layer is made of a towel or other plush or soft material including but not limited to terrycloth. In some embodiments, the absorbent layer comprises a natural fiber, a synthetic fiber, or a combination thereof. In some embodiments, the natural fiber may be vegetable or cellulose based. Examples of such vegetable or cellulose based natural fibers include, but are not limited to, cotton, flax, jute, hemp, bamboo, and raffia. In some embodiments, the natural fiber may be animal based, for example, without limitation, wool. In some embodiments, the synthetic fiber may be acrylic, viscose, rayon, nylon, polyester, and a combination of any thereof.

In some preferred embodiments, the absorbent layer (e.g., 120 in FIG. 1) comprises cotton, bamboo, rayon, polyamide, polyester and/or a combination thereof. In some embodiments, the absorbent layer comprises a recycled fiber. In some embodiments, the absorbent layer comprises a durable material. In some embodiments, the absorbent layer is washable, dryable, or a combination thereof. In some embodiments, the absorbent layer may be exposed to temperatures from about 125 degrees Fahrenheit to about 135 degrees Fahrenheit without damage to the absorbent layer. In some embodiments, the absorbent layer is permanently attached to the first portion of the permeable non-slip layer (e.g., 112 in FIG. 2). In some embodiments, the absorbent layer is detachable from the permeable non-slip layer (e.g., 212 in FIG. 4A). In some embodiments, the absorbent layer includes a zipper or other attachment mechanism that allows the absorbent layer to be detachable from the permeable non-slip layer (e.g., 230 in FIG. 4A). In some embodiments, a zipper or other attachment mechanism may be located on a perimeter edge of the rug system. In some embodiments, two zippers may be located on perimeter edges on opposite sides of the rug system (e.g., 230 in FIG. 4A). In some embodiments a single zipper may be located across three or four perimeter edges of the rug system.

In some embodiments, there is at least one closing mechanism (e.g., 150 in FIG. 1) on one or more of the non-hinge edges of the rug system 100. In some embodiments, a portion of or all of the closing mechanism is attached to the permeable non-slip layer (e.g., 110 in FIG. 1). In some embodiments, a portion of or all of the closing mechanism is attached to the absorbent layer (e.g., 120 in FIG. 1). In some embodiments, the closing mechanism is attached to both the permeable non-slip layer and the absorbent layer. In some embodiments, there is at least one closing mechanism attached to a side edge of the rug system. In some embodiments, there is at least one closing mechanism attached to the top edge of the rug system (e.g. 265 in FIG. 3).

In some embodiments, the closing mechanism is a means for stowing and deploying the permeable, non-slip layer (e.g., 110 in FIG. 1). In some embodiments, the closing mechanism (e.g., 150 in FIG. 1) forms an openable and closeable seam, and as such, is a releasable component and may be composed of means for stowing and deploying, which may include one or more of a zipper, Velcro, hooks, loops, magnets, snaps, buttons, ties or other components which are capable of non-permanently contacting the first portion of the permeable non-slip layer (e.g., 112 in FIG. 1) in a parallel manner with the second portion of the permeable non-slip layer (e.g., 114 in FIG. 1). In some embodiments, the closing mechanism is a unitary structure with the permeable non-slip layer and/or the absorbent layer. When the closing mechanism is engaged or closed (for example, a zipped zipper), the rug system is in a stowed configuration. When the closing mechanism is disengaged or opened (for example, an unzipped zipper), the rug system is in a deployed configuration.

As may be appreciated by those of skill in the art, the rug system may be of various shapes and sizes to suit the requirements of the user. In some embodiments, the rug system is the standard height of a bathroom tub. In at least some embodiments, the rug system is generally rectangular in shape. In some embodiments, when there is a longer edge and a shorter edge, the longer edge is between about 65 cm and about 85 cm in length, and the shorter edge is between about 30 cm and about 60 cm in length. In some embodiments, when there is the longer edge and the shorter edge, the hinge extends along the longer edge. In some embodiments, when there is the longer edge and the shorter edge, the hinge extends along the shorter edge. In some embodiments, the rug system may have square corners. In some embodiments, the rug may have rounded corners. In some embodiments, the rug system may have straight edges. In some embodiments, the rug system may have a straight hinge edge and rounded or non-straight non-hinge edges. In some embodiments, the length of the rug system (or longer edge of the rug system) may range from about 50 cm to about 130 cm. In some embodiments, the width of the rug system may range from about 35 cm to about 65 cm. In some embodiments, the thickness of the rug system may range from about 1 cm to about 15 cm. In preferred embodiments, the thickness of the rug system may range from about 2.5 cm to about 12 cm.

In some embodiments, the rug 1 is manufactured by an injection molding process. In some embodiments, the rug system is manufactured by a 3-D printing process. In some embodiments, the rug system is manufactured by a weaving process. In some embodiments, the rug system is manufactured as a unitary structure containing the permeable non-slip layer (e.g., 110 in FIG. 1), the absorbent layer (e.g., 120 in FIG. 1), and the closing mechanism (e.g., 150 in FIG. 1). In some embodiments, the rug system is manufactured as a unitary structure containing the permeable non-slip layer, the absorbent layer, the closing mechanism, and one or more surface fasteners.

In some embodiments, the rug system is manufactured in separate pieces which are subsequently attached together. In some embodiments, the permeable non-slip layer (e.g., 110 in FIG. 1) is manufactured by an injection molding process or a 3-D printing process. In some embodiments, the permeable non-slip layer (e.g., 110 in FIG. 1) and the absorbent layer (e.g., 120 in FIG. 1) are manufactured as a unitary structure by an injection molding process or a 3-D printing process. In some embodiments, the permeable non-slip layer and the absorbent layer are attached by heating, melting, bonding, or a combination of any thereof. In some embodiments, the permeable non-slip layer and the absorbent layer are attached by lamination. In some embodiments, the permeable non-slip layer and the absorbent layer are attached by lamination with an acrylic polymer. In some embodiments, the permeable non-slip layer and the absorbent layer are attached by sewing or stitching. In some embodiments, the permeable non-slip layer and the absorbent layer are attached by gluing. In some embodiments, the means of attaching the permeable non-slip layer and the absorbent layer may be exposed to temperatures from about 125 degrees Fahrenheit to about 135 degrees Fahrenheit without damage to the means or without causing separation of the permeable non-slip layer from the absorbent layer.

In some embodiments, the rug system is configured to operate as a bathroom rug. Although references herein have been primarily made to a bathroom rug, embodiments of the present invention may be used in any number of locations, including but not limited to exterior locations and interior locations. In some embodiments, the rug system is an exterior rug. In some embodiments, the rug system is a kitchen rug. In some embodiments, the rug system is a pet rug. In some embodiments, the rug system is an area rug. In some embodiments, the rug system is a hall rug. In some embodiments, the rug system is an interior rug. Embodiments of the present invention may be used anywhere with a vertical surface capable of attachment to the present invention by using the methods and means described in this specification. Examples of such vertical surfaces include, but are not limited to, a bathtub, an interior wall, an exterior wall, and any type of door, including but not limited to a shower door, a glass sliding door, a flush door, and a panel door. In some embodiments, the rug system is configured as a foldable dish drying rug or mat, which can be affixed to a vertical surface (e.g., a wall) and deployed next to a sink in order to provide a space for drying dishes. After the dishes are dry the system can be placed into its stowed configuration to reduce its footprint (e.g., on the kitchen counter).

In some embodiments, a layer is described as a permeable, non-slip layer. In some embodiments, the layer may be permeable to air and/or liquid. In some embodiments, the material forming the layer is impermeable to liquid and/or air but includes channels for conveying liquid and/or air through the layer.

Figure 9A:
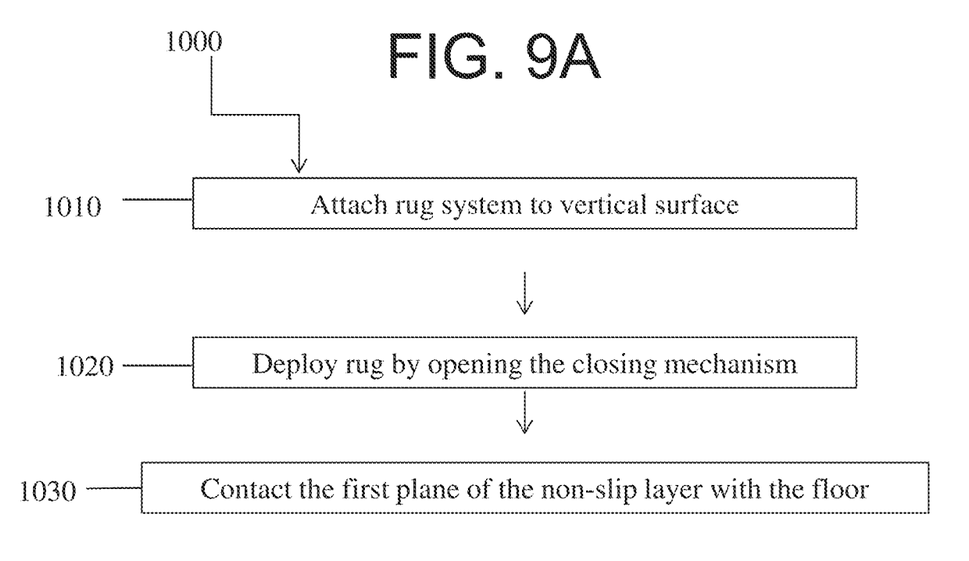
FIGS. 9A and 9B are flow charts illustrating exemplary methods of using the presently disclosed rug.

FIG. 9A is a flow chart illustrating a method according to embodiments of the present disclosure. Deployment method 1000 includes attaching 1010 a rug system to a vertical surface. This step 1010 may use one or more surface fasteners. In some embodiments, the one or more surface fasteners are permanently attached to a permeable non-slip layer of the rug system. In other embodiments, the one or more surface fasteners are removable from the permeable non-slip layer and are capable of being adjusted per the user's preference or needs of the vertical surface to which the rug is to be attached. Prior to step 1010 or subsequent to step 1010, in some embodiments, a first portion of the permeable non-slip layer, an absorbent layer of the rug system, and a second portion of the permeable non-slip layer are in a parallel configuration, secured by a closing mechanism. Step 1020 includes deploying the rug system by activating the closing mechanism. In some embodiments, step 1020 includes unzipping zippers located on non-hinge edges of the rug system. Step 1030 includes placing a portion of the permeable non-slip layer in parallel to a floor surface. In some embodiments, this includes placing that portion of the permeable non-slip layer in contact with the floor surface. In some embodiments, step 1030 includes increasing the angle of a hinge portion located intermediate the first portion and the second portion of the permeable non-slip layer to between 80 degrees and 110 degrees.

Figure 9B:
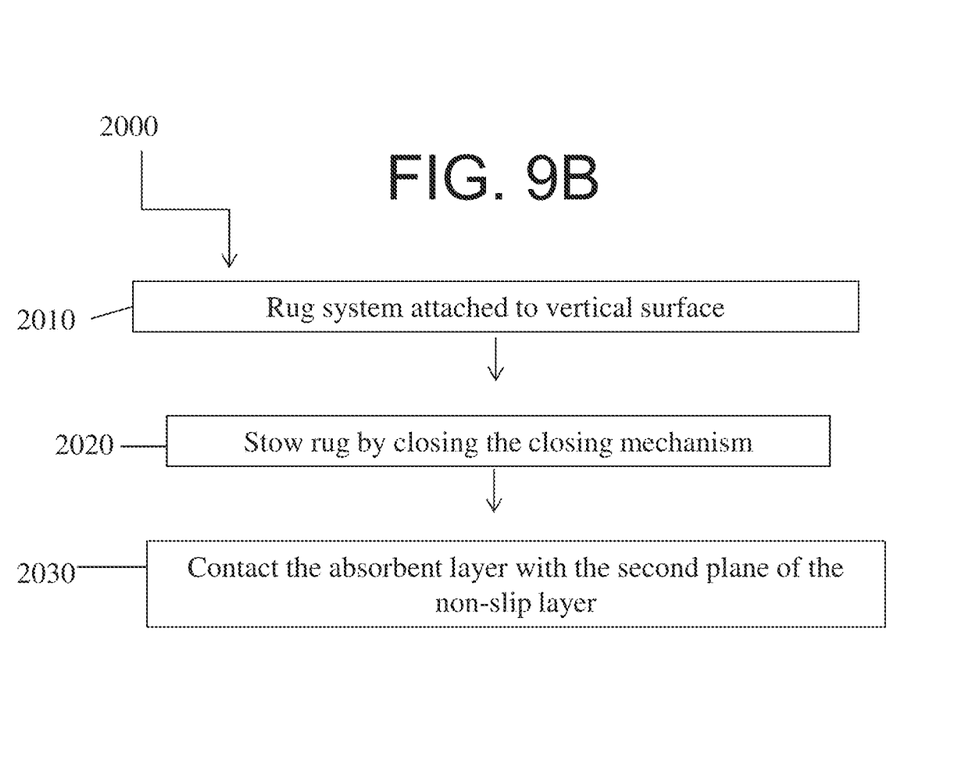

FIG. 9B is a flow chart illustrating a method of operating a rug system according to embodiments of the present disclosure. Stowage method 2000 includes a rug system attached to a vertical surface. Either prior to attachment or after attachment, the rug system may be placed into a deployed configuration. Step 2020 includes stowing the rug system by activating a closing mechanism, which may include moving a portion of a permeable non-slip layer away from a position in which it lies parallel to a floor surface (e.g., contacting the floor surface) and towards a position in which it is parallel with another portion of the permeable non-slip layer and/or the vertical surface. Step 2020, in some embodiments, includes decreasing an angle of a hinge portion of the permeable non-slip layer to less than 10 degrees. This could include placing a first portion of the permeable non-slip layer, an absorbent layer, and a second portion of the permeable non-slip layer into a parallel or substantially parallel alignment. Step 2020, in some embodiments, includes contacting the absorbent layer with an inner surface of the second portion of the permeable non-slip layer. In some embodiments, step 2020 includes decreasing the angle of the hinge portion to less than 5 degrees.

While this disclosure describes exemplary designs, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

The following is claimed:

1. A permeable, non-slip layer for a rug comprising:
an upper portion comprising a first edge;
one or more surface fasteners connected to the upper portion, the one or more surface fasteners being configured to removably attach the upper portion to a vertical surface;
a lower portion comprising a lower surface and an upper surface, wherein the lower portion is formed of a water impermeable material having a plurality of moisture channels configured to transmit moisture from the upper surface to the lower surface, wherein the lower portion comprises a second edge;
a flexible hinge connecting the first edge of the upper portion and the second edge of the lower portion so that the lower portion can move from a deployed configuration adjacent the floor to a stowed configuration adjacent the upper portion; and
a closing mechanism connected to perimeter edges of the upper portion and the lower portion, the closing mechanism being configured to selectively retain and deploy the lower portion in the stowed configuration and the deployed configuration.

2. The permeable, non-slip layer of claim 1, wherein the upper portion includes moisture channels sized to receive and secure the one or more surface fasteners configured to couple the upper portion to the vertical surface.

3. The permeable, non-slip layer of claim 1, wherein at least some of the moisture channels are regularly spaced.

4. The permeable, non-slip layer of claim 1, wherein the lower portion includes a region having between 25 and 75 moisture channels per cm$^2$.

5. The permeable, non-slip layer of claim 1, wherein the moisture channels have a width dimension of about 0.5 mm to about 2 mm.

6. The permeable, non-slip layer of claim 1, wherein the lower portion is configured to couple to an absorbent layer.

7. The permeable, non-slip layer of claim 1, wherein the moisture channels are at least partially defined by a plurality of raised projections.

8. The permeable, non-slip layer of claim 1, wherein the closing mechanism comprises a zipper.

9. The permeable, non-slip layer of claim 1, wherein the closing mechanism comprises a magnetic fastener.

10. The permeable, non-slip layer of claim 1, wherein the closing mechanism is a first closing mechanism, and further comprising a second closing mechanism connected to perimeter edges of the upper portion and the lower portion, the second closing mechanism being configured to selectively retain and deploy the lower portion in the stowed configuration and the deployed configuration.

11. The permeable, non-slip layer of claim 1, wherein the upper portion and the lower portion are substantially parallel when the lower portion is in the stowed configuration.

12. The permeable, non-slip layer of claim 1, wherein the perimeter edges comprise an upper edge opposite the first edge and a side edge extending between the first edge and the upper edge, the closing mechanism being connected to the upper edge.

13. The permeable, non-slip layer of claim 1, wherein the perimeter edges comprise an upper edge opposite the first edge and a side edge extending between the first edge and the upper edge, the closing mechanism being connected to the side edge.

14. The permeable, non-slip layer of claim 1, wherein the upper portion further comprises:
an outer surface carrying the one or more surface fasteners; and
an inner surface opposite the outer surface, the inner surface configured to face the lower portion in the stowed configuration.

15. A permeable, non-slip layer for a rug comprising:
an upper portion comprising a first edge;
one or more fastener mechanisms connected to the upper portion, the one or more fastener mechanisms being configured to removably attach the upper portion to a vertical surface;
a lower portion comprising a lower surface and an upper surface, wherein the lower portion is formed of a water impermeable material having a plurality of moisture channels configured to transmit moisture from the upper surface to the lower surface, wherein the lower portion comprises a second edge;
a flexible hinge connecting the first edge of the upper portion and the second edge of the lower portion so that the lower portion can move from a deployed configuration adjacent the floor to a stowed configuration adjacent the upper portion; and
a closing mechanism connected to perimeter edges of the upper portion and the lower portion, the closing mechanism being configured to selectively retain and deploy the lower portion in the stowed configuration and the deployed configuration.

16. The permeable, non-slip layer of claim 15, wherein the upper portion includes moisture channels sized to receive and secure the one or more fastening mechanisms configured to couple the upper portion to the vertical surface.

17. The permeable, non-slip layer of claim 15, wherein the upper portion further comprises:
an outer surface carrying the one or more surface fasteners; and
an inner surface opposite the outer surface, the inner surface configured to face the lower portion in the stowed configuration.

* * * * *